Patented Nov. 18, 1924.

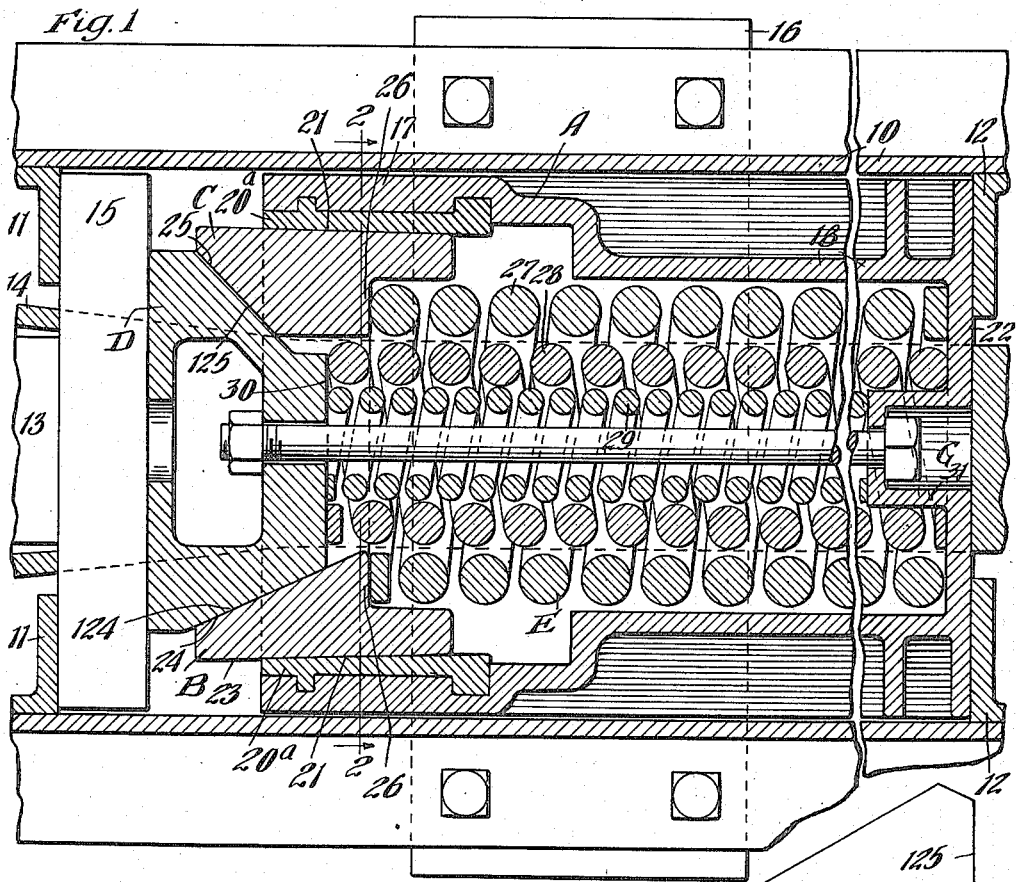

1,515,876

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 16, 1922, Serial No. 588,571. Renewed June 7, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein is obtained high capacity, the mechanism consisting of few parts and so arranged as to insure certain release.

Another object of the invention is to provide a friction shock absorbing mechanism of the character indicated wherein a keen angle wedging effect is obtained in compression and a blunt angle effect in release, thus permitting of substantially any desired high frictional capacity accompanied by certain release, and all without the necessity of anti-friction rollers, anti-friction pads or other corresponding expedients that have heretofore been deemed necessary.

A still further object of the invention is to provide a friction shock absorbing mechanism of the character indicated in the preceding paragraphs and with which is employed a spring resistance consisting of a plurality of separate units, certain units co-operating directly with the friction shoes and other units with the wedge proper for the purpose of affording a yielding resistance to the relative movement of the friction elements and the shell and also to increase the effectiveness of the release action.

In the drawing forming a part of this specification, Figure 1 is a horizontal longitudinal sectional view of a portion of a railway draft rigging showing my improvements employed in connection therewith. Figure 2 is a vertical transverse sectional view, taken substantially on the line 2—2 of Figure 1. And Figure 3 is a detail perspective of the wedge employed in my construction.

In said drawing, 10—10 denote the usual channel draft sills of a railway car, to the inner faces of which are secured front stop lugs 11—11 and rear stop lugs 12. A portion of a drawbar is indicated at 13, the same being operatively associated with the shock absorbing mechanism proper by a hooded cast yoke 14 within which the mechanism is disposed, as is also a front follower 15. The yoke and associated movable parts are supported in operative position by a detachable saddle plate 16.

In the specific embodiment of the invention as illustrated, I employ, broadly, a combined friction shell and spring cage casting A; a pair of friction shoes B and C; a single wedge D; a spring resistance designated generally by the reference character E; and a retainer bolt G.

The casting A is formed with a friction shell proper 17 at the forward end thereof, with the spring cage or casing 18 at the rear end. The shell 17 is of substantially hollow rectangular box-like form having upper and lower walls 19—19 and side walls 20—20. The inner faces of the side walls 20 are suitably notched to accommodate inserts $20^a$ of suitable wear-resisting metal, the inner faces of said inserts $20^a$ providing longitudinally extending friction surfaces 21—21. In actual practice, the surfaces 21 will be made inwardly converged.

The spring cage 18 may be made cylindrical to accommodate and properly center the spring resistance E and at its rear end is preferably formed with an integral wall 22 which is laterally extended and suitably reinforced so as to adapt it to act as the rear follower of the mechanism.

The friction shoes B and C, while of generally similar construction, differ with respect to their inclined faces. Each shoe is of course provided on its exterior with a flat friction surface 23 adapted to cooperate with the respective shell friction surface 21. On its inner side, the shoe B is formed with an inclined face 24 which extends at a relatively acute or keen wedging angle with respect to the axis of the shell or center line of draft and forces applied approximately parallel to the center line of draft. The shoe C is provided on its inner side with an inclined face 25 which extends at a relatively blunt angle with respect to the axis of the shell and forces applied approximately parallel thereto. The wedge D is formed with correspondingly inclined faces 124 and 125, respectively.

Each of the shoes B and C is formed intermediate its ends with an inwardly transversely extended shoulder 26, said shoulders 26 providing bearings for the front end of the outer heavy coil 27 of the spring resistance E, the latter, as shown, consisting of said outer coil 27 and two additional inner nested coils 28 and 29. The rear end of the spring 27 bears on the rear wall 22 of the casting A. The other two coils 28 and 29 bear at their front ends on the rear transverse face 30 of the wedge D.

The retainer bolt G passes through suitable openings in the wedge D and is anchored at its forward end to said wedge and at its rear end to a hollow boss 31 cast integral with the rear wall 22 of the casting A.

The faces 25 and 125 are extended at such a blunt angle with respect to the axis of the mechanism as to prevent any substantial or appreciable wedging, sliding or spreading action between the wedge D and shoe C when compression forces are transmitted substantially longitudinally or parallel to the axis of the mechanism in either buff or draft.

The angle of said faces 25 and 125 will vary in accordance with the materials employed for the various friction-creating parts and in accordance with the degree of taper of the friction shell surfaces 21. In practice, however, the angle of said faces 25 and 125 will be such that there is slight, if any, wedging effect so that it may be said that said faces 25 and 125 are substantially non-wedging during a compression stroke with respect to buffing or pulling forces applied parallel to or approximately parallel to the axis of the mechanism. The angle of inclination of the faces 24 and 124 will be made relatively acute and, in fact, may be made much more acute or keener than has heretofore been deemed successfully possible in a friction mechanism wherein the wedging or spreading action is imposed directly by a single pressure-transmitting wedge on friction shoes proper, the reason that I am enabled to make said angle of the faces 24 and 124 being that the release is not initially effected therebetween but is effected elsewhere as hereinafter explained.

The operation is as follows: Assuming an inward or buffing movement of the drawbar, the wedge D will be forced rearwardly with a wedging or spreading effect and the wedging action will occur substantially between the wedge D and the shoe B, sliding or wedging action on the faces 25 and 125 being negligible. Obviously, there will be an equal reaction which will force the wedge D transversely against the shoe C so that the pressure between the shoes B and C and the shell will be equalized. In carrying out my invention, the spring resistance will afford certain capacity but the greater part of the shock absorbing resistance is obtained by the friction generated between the shoes and shell, the main function of the spring resistance E being that of restoring the parts to normal condition.

At the end of the compression stroke and upon removal of the actuating force, it is evident that great forces will have been stored up in the friction shell, due to the expansion of the latter. Consequently, the shell will contract and the forces therefrom will be exerted radially inwardly on the shoes. Considering first the contraction of the shell with respect to the release action, it is obvious that the faces 24 and 124 extend at a relatively blunt non-releasing angle to said radially inwardly directed forces and, consequently, the faces 24 and 124 are not effective during initial release. Conversely, the faces 25 and 125, which are made of suitable releasing angle, oppose no effective resistance or sticking action to the radially inwardly directed forces of the shell so that said face 25 acts as a wedge at this time to functionally free the wedge D from the shoes and otherwise leaving loose or loosening such wedge; whereupon the group of friction elements collapses sufficiently for the spring to restore the parts to normal position, the parts properly positioning themselves with relation to each other at the end of the release action.

Irrespective of the contracting forces of the shell and considering the wedge D at the moment when the buffing or compression force ceases, it will drop away from the shoe C, the face 25 of the shoe C opposing no resistance to such movement. Furthermore, the two coils 28 and 29 of the spring resistance bear directly upon the wedge D and automatically and instantaneously serve, upon discontinuance of the compression force, to lift the wedge D from between the releasing angle defined by the faces 25 and 24. The initial collapse or break in the friction elements, therefore, occurs between the faces 25 and 125. The taper of the shell surfaces 21 is of further assistance in insuring restoration of all of the parts to normal position, inasmuch as the movable friction elements, when collapsed or released, may readily be projected outwardly under the influence of the expanding spring coils without danger of the shoes wedging or jamming with the shell.

With my improvements, it will be observed that I can obtain substantially any desired wedging effect and at the same time insure certain release; the design is exceedingly simple; consists of few parts; and the wedge and friction elements may be readily manufactured as ordinary castings.

By the term "wedging" as herein used and applied to the faces 24 and 124, I mean that, during a compression stroke of the mechanism, the face 124 will slip on the face 24. By the term "non-wedging," as herein used and applied to the faces 25 and 125, I mean that, in a compression movement of the mechanism, there will be no appreciable slippage of either of the faces 25 and 125 on the other. If there should be such slippage in either direction, it does not interfere in any way with the operation of the mechanism during compression and the certain result is that the release of the mechanism will take place without difficulty by reason of the blunt angle of said faces 25 and 125.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces; of friction shoes cooperable with said shell; spreader means cooperable with said shoes, said shoes and spreader means having a plurality of cooperating sets of faces, a pair of which are arranged at a relatively keen wedge-acting angle and others at a relatively blunt non-wedge-acting angle during the compression action, said faces acting in an opposite manner during release; a spring resistance yieldingly resisting relative movement between the friction shoes and the shell; and independent spring means directly yielding resisting relative movement between said spreader means and the shell.

2. In a friction shock absorbing mechanism, the combination with a friction member having longitudinally extending friction surfaces; of friction shoes cooperable with the surfaces of said member; a pressure-transmitting member, said pressure-transmitting member and shoes having cooperating faces, some arranged at a relatively keen wedge-acting angle and in part at a relatively blunt non-wedge-acting angle during a compression stroke, said faces acting reversely during the release action; and a multiple-unit spring resistance, one unit of said resistance being arranged to directly resist movement between the shoes and said friction member and another unit to directly resist movement between the pressure-transmitting member and said friction member.

3. In a friction shock absorbing mechanism, the combination with a friction member having longitudinally extending friction surfaces; of a plurality of friction shoes cooperable with the surfaces of said member; a combined pressure-wedge member cooperable with said shoes, one of said shoes and wedge member having co-acting sets of faces arranged at a relatively keen wedge-acting angle during compression, another shoe and said pressure-wedge member having co-acting faces extending at a relatively blunt non-wedge-acting angle during the compression action; and a multiple-unit spring resistance having one unit thereof cooperating directly with the friction shoes and another unit thereof cooperating directly with said pressure-wedge member.

4. In a friction shock absorbing mechanism, the combination with a friction shell having interior friction surfaces converged inwardly of the shell; of friction shoes cooperable with the surfaces of said shell; spreader means cooperable with the shoes, said shoes and spreader means having cooperating faces, some arranged at a relatively keen wedge-acting angle and others at a relatively blunt non-wedge-acting angle during the compression stroke, said faces acting reversely during a release action; a spring resistance interposed between said spreader means and the shell; and another spring resistance interposed between said shoes and the shell.

5. In a friction shock absorbing mechanism, the combination with a friction shell provided with interior longitudinally extending friction surfaces; of a pair of friction shoes within said shell, one shoe having an inner face extending at a keen wedge-acting angle with respect to the axis of the shell and the other having an inner face extending at a different and obtuse releasing angle with respect to said axis; a one-piece member having correspondingly inclined faces co-acting with said faces of said shoes; and a multiple-unit spring resistance having one unit thereof cooperable directly with said shoes and another unit cooperable directly with said one-piece member.

6. In a friction shock absorbing mechanism, the combination with a friction shell provided with interior longitudinally extending friction surfaces converged inwardly of the shell; a pair of friction shoes within said shell and frictionally cooperable with the surfaces thereof, one shoe having an inner face extending at a keen wedge-acting angle relative to the axis of the shell, and the other having an inner face extending at a different and obtuse releasing angle relative to said axis; a one-piece member having correspondingly inclined faces co-acting with said faces of the friction shoes; and a multiple-unit spring resistance having one unit thereof cooperable directly with the shoes and another unit thereof cooperable directly with said one-piece member.

7. In a friction shock absorbing mechanism, the combination with a friction shell; of friction shoes operating within the shell; a shock-transmitting wedge operative between said shoes, one of said shoes having a wedge face at an angle which is acute and of high friction-creating capacity and non-releasing, and another opposing friction shoe having a face engaged by said wedge at a wedge-releasing angle opposed to said wedge face of the first shoe; and a multiple-unit spring resistance, one unit of said spring resistance engaging directly said two shoes and another unit engaging said wedge, the opposite ends of said units engaging the shell to thereby yieldingly resist relative movement between the shell and the shoes and wedge.

In witness that I claim the foregoing I have hereunto subscribed my name this 17th day of August, 1922.

JOHN F. O'CONNOR.

Witnesses:
UNA C. GRIGSBY,
ANN BAKER.